United States Patent [19]
Stevenson

[11] Patent Number: 5,370,800
[45] Date of Patent: Dec. 6, 1994

[54] METHOD FOR REMOVING METAL COMPOUNDS FROM WASTE WATER

[76] Inventor: Sanford M. Stevenson, 124 Braun Dr., McMurray, Pa. 15317

[21] Appl. No.: 72,418

[22] Filed: May 25, 1993

[51] Int. Cl.$^5$ ............................................. C02F 1/56
[52] U.S. Cl. ............................... 210/710; 210/721; 210/722; 210/725; 210/727; 210/738; 210/747; 210/911; 210/912; 210/913
[58] Field of Search ............... 210/710, 721, 722, 724, 210/725, 727, 728, 738, 768, 770, 912, 913, 747, 911

[56] References Cited

U.S. PATENT DOCUMENTS

| | | | |
|---|---|---|---|
| 3,931,007 | 1/1976 | Sugano et al. | 210/721 |
| 4,159,248 | 6/1979 | Taylor et al. | 210/96.1 |
| 4,192,743 | 3/1980 | Bastgen et al. | 210/770 |
| 4,632,758 | 12/1986 | Whittle | 210/603 |
| 4,724,084 | 2/1988 | Pahmeier et al. | 210/725 |
| 4,749,497 | 6/1988 | Kanzleiter et al. | 210/721 |
| 4,758,353 | 7/1988 | Spence et al. | 210/725 |
| 4,814,091 | 3/1989 | Napier et al. | 210/665 |
| 5,013,453 | 5/1991 | Walker | 210/721 |

Primary Examiner—Peter A. Hruskoci
Attorney, Agent, or Firm—Daniel J. Long

[57] ABSTRACT

A method for removing metal compounds from waste water comprising the steps of adjusting the pH of the water to from 5 to 12 and preferably 6 to 9; aerating the waste water; adding a flocculating agent to the water and allowing floccules including metal compounds to form; and separating said floccules including metal compounds from the water. An apparatus for carrying out this method is also disclosed.

25 Claims, 2 Drawing Sheets

METHOD FOR REMOVING METAL COMPOUNDS FROM WASTE WATER

BACKGROUND OF THE INVENTION

The present invention relates to the treatment of waste water, and, in particular, to the treatment of water to remove various precipitated or suspended metal compounds therefrom.

Runoffs from a number of industrial operations such as electrical power plants, steel plants and mines are known to be contaminated with various metal compounds including iron, manganese, aluminum, zinc, copper, lead, arsenic and chromium. Such contaminants may pose a serious environmental problem. Methods heretofore used to remove such contaminants have included the use of additional lime, soda ash or other neutralizing agents and the use of holding ponds or clarifying tanks. Such methods have not, however, been entirely satisfactory because of the lengthy periods of time which they would generally be required to effect treatment.

SUMMARY OF THE INVENTION

It is therefore an object of the present invention to provide an improved method and apparatus for removing precipitate or suspended metal compounds from waste water.

In this method the pH of the water is first adjusted from 6 to 10. Preferred neutralizing agents are sodium hydroxide, and anhydrous ammonia when the waste water is overly acidic or sulfuric acid or hydrochloride acid when it is overly basic. The water is also aerated to a dissolved oxygen concentration of from 0.01 lb./hr. to 70 lb./hr. at a raw water input flow rate of 50 gal./min. to gal./min. to 500 gal./min. Neutralization and aeration may preferably be done simultaneously. A polymeric flocculating agent is then added to the water. The metal compounds are then flocculated, and the flocculated metal compounds are separated from the water by means of a rotary drum thickener, clarifier or other suitable means. A preferred flocculating agent is an anionic or cationic polymer wherein the use of an anionic polymer would be preferred for primary clarification or setting purposes while the cationic polymer would be preferred for dewatering purposes. The flocculated metal compounds are then further dewatered in a belt filter press or other suitable apparatus.

BRIEF DESCRIPTION OF THE DRAWINGS

The present invention is further described with reference to the accompanying drawing in which.

DETAILED DESCRIPTION

Figure 1:
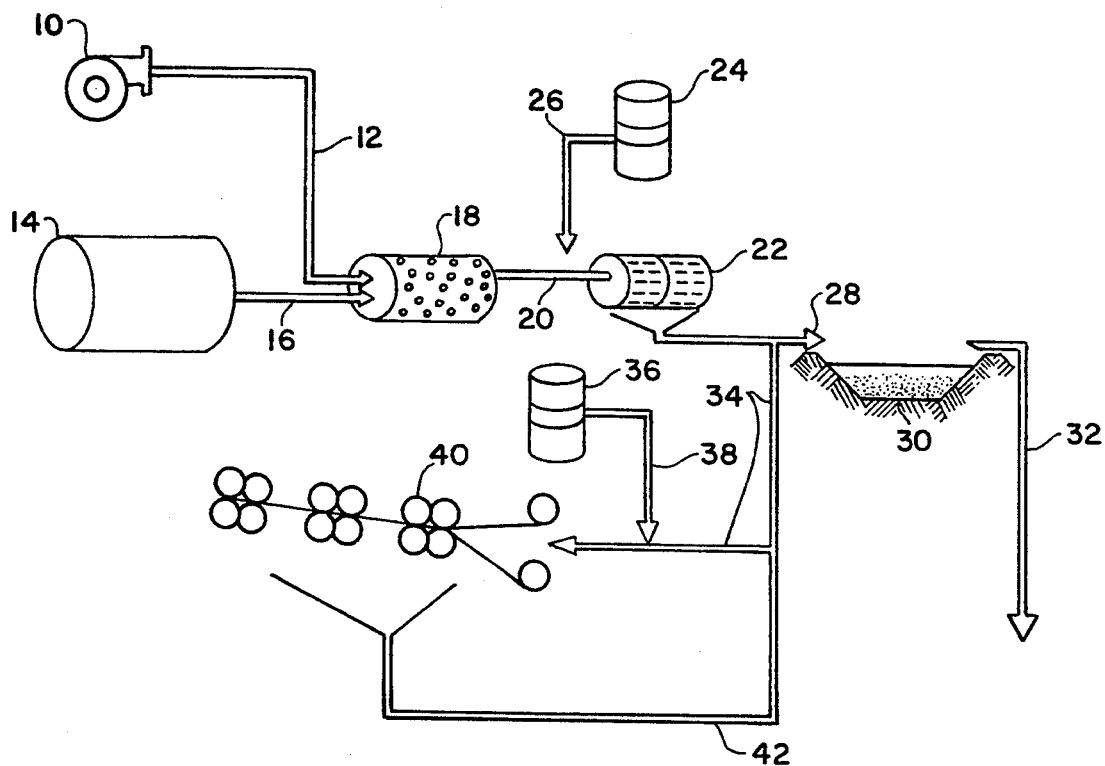
FIG. 1 is a schematic drawing of apparatus used to carry out one preferred embodiment of the method of the present invention.

Referring to FIG. 1, the raw water source is shown at numeral 10. Waste water is removed from this source in line 12. Neutralizing agent tank 14 is connected by line 16 to reaction tank 18 where water from line 12 is simultaneously mixed with neutralizing agent, aerated and agitated. A preferred embodiment of the reaction tank 18 is described in U.S. Pat. No. 4,749,497 although it has now been found that in some cases the apparatus disclosed in that patent may be advantageously modified by the removal of its baffles and the relocation of the aeration mixing unit to a 45° angle to the vertical plane of the reaction tank. The rate of aeration would normally be from about 0.01 lbs./hr. to about 70 lbs./hr. for a metals concentration of 50 mg./l. to 1,000 mg./l. at a raw water input flow rate of 50 gal./min. to 500 gal./min. The pH of the water is adjusted to between 5 and 12 and preferably to between 6 and 9. It will be understood that for regulatory reasons if the pH is adjusted to above 9, it will ordinary be necessary to reduce the pH to below that level on completion of the process described herein. The water is then removed in line 20 to rotary drum thickener 22. A flocculating agent from polymer tank 24 is also moved in line 26 to line 20 to be mixed with the water in rotary drum thickener 22 where the metal compounds are flocculated and separated. Such polymers which are used for primary clarification purposes are anionic polymers. NALCO 7767 is a suitable commercially available anionic polymer. Cationic polymers may be used for dewatering purposes and may be selected from the following commercially available polymers: PERCOL AC 737 and UNIFLOC 630. Water from the rotary drum thickener is removed in line 28 to polishing pond 30 from where outfall is removed in line 32. Water and flocculated metal compounds are removed from the rotary drum thickener in line 34. Additional polymer from polymer tank 36 is moved in line 38 to be mixed with water and flocculated metal compound in line 38 which are then moved to belt filter press 40 where the floccules are dewatered and from which water is removed to the polishing pond in line 42.

Figure 2:
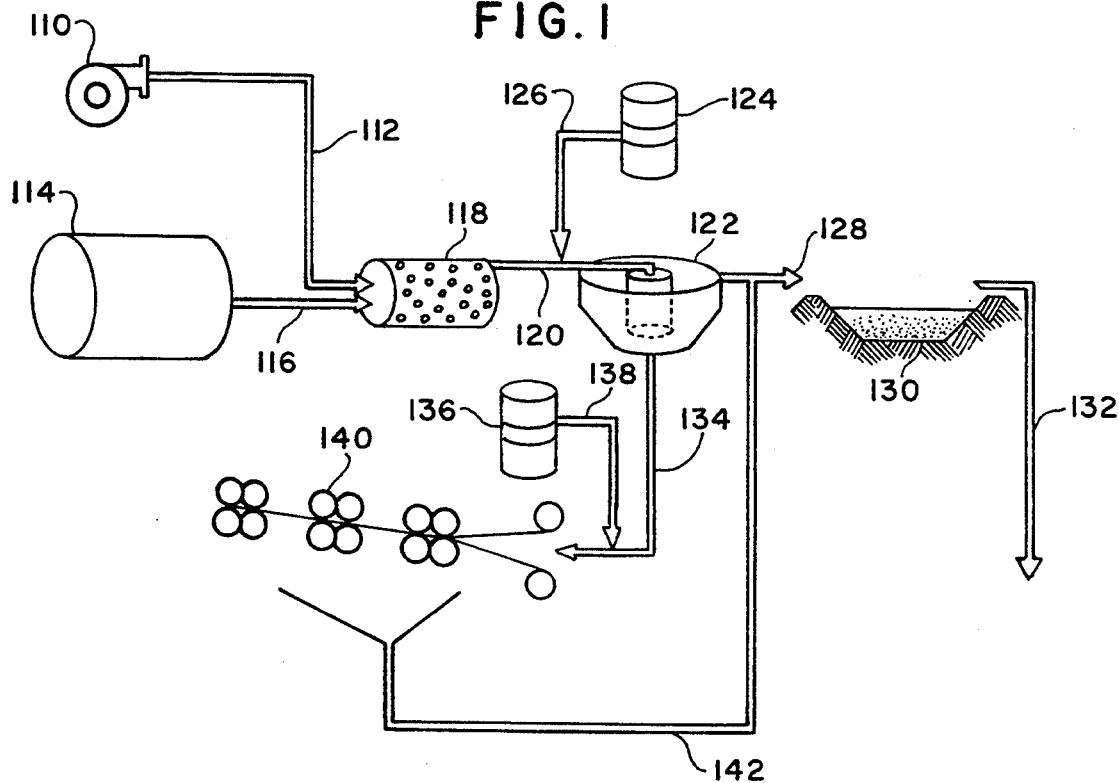
FIG. 2 is a schematic drawing of apparatus used to carry out another preferred embodiment of the method of the present invention.

Referring to FIG. 2, waste water from a raw water source 110 is removed in line 112 to be mixed with neutralizing agent from tank 114 moved in line 116 to reaction tank 118. The neutralized, aerated and agitated water is then removed in line 120 to clarifier 122 to which flocculating agent from polymer tank 124 through line 126 is mixed. Water is removed from the clarifier in line 128 to polishing pond 130 from where outfall is released from line 132. Flocculated metal compound along with water is removed from the clarifier in line 134 from where is mixed with additional polymer from polymer tank 136 and line 138 and then dewatered in belt filter press 140 where additional water is removed and transported to the polishing pond in line 142.

Figure 3:
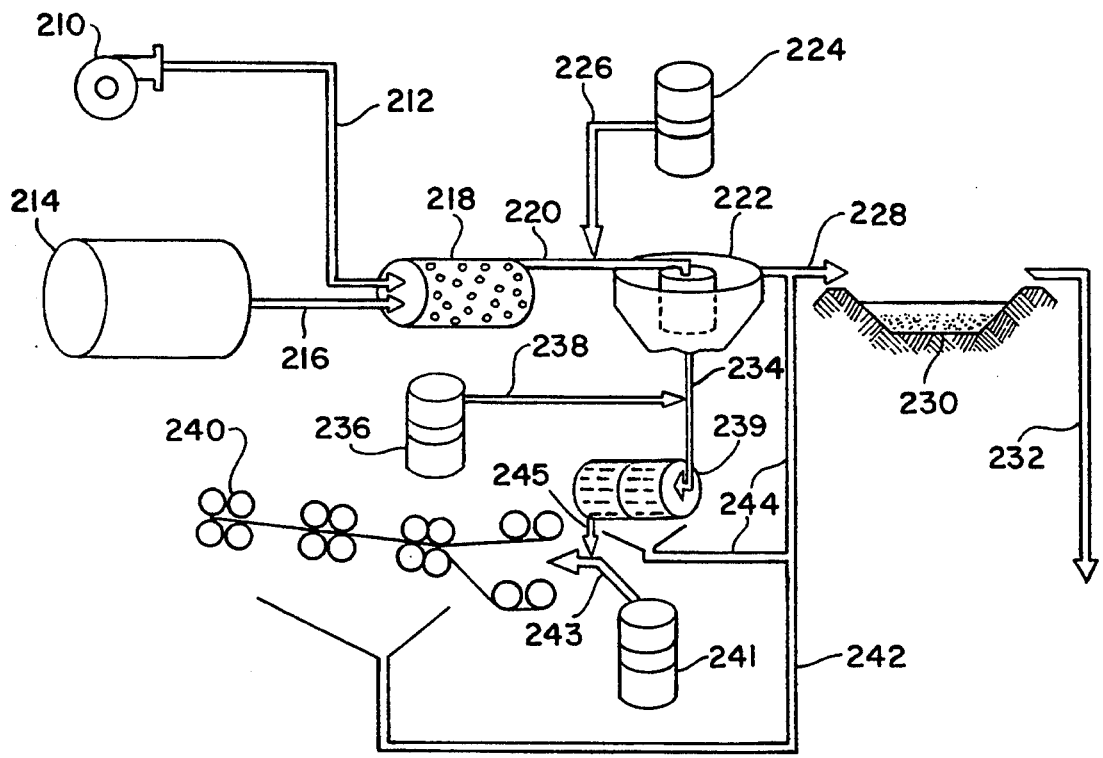
FIG. 3 is a schematic drawing of apparatus used to carry out a third preferred embodiment of the method of the present invention.

Referring to FIG. 3, waste water from raw water source 210 is removed in line 212 and neutralizing agent from tank 214 is removed in line 216 to reaction tank 218 from where it is removed in line 220 to clarifier 222 after being mixed with flocculating agent from polymer tank 224 moved through line 226. Water from the clarifier is removed in line 228 to polishing pond 230 from where outfall is removed in line 232. Floccules containing metal compounds are removed with water from the clarifier in line 234. Additional polymer from polymer tank 236 removed in line 238 to be mixed with the floccules which are then introduced to rotary drum thickener 239 and are then introduced to belt filter press 240 after mixed with additional polymer from tank 241 which is removed in line 243 and mixed with water from the rotary drum thickener removed through line 245. Water from the belt filter press is removed in line 242 and transformed with water from line 244 from rotary drum thickener 239 to the polishing pond.

Figure 4:
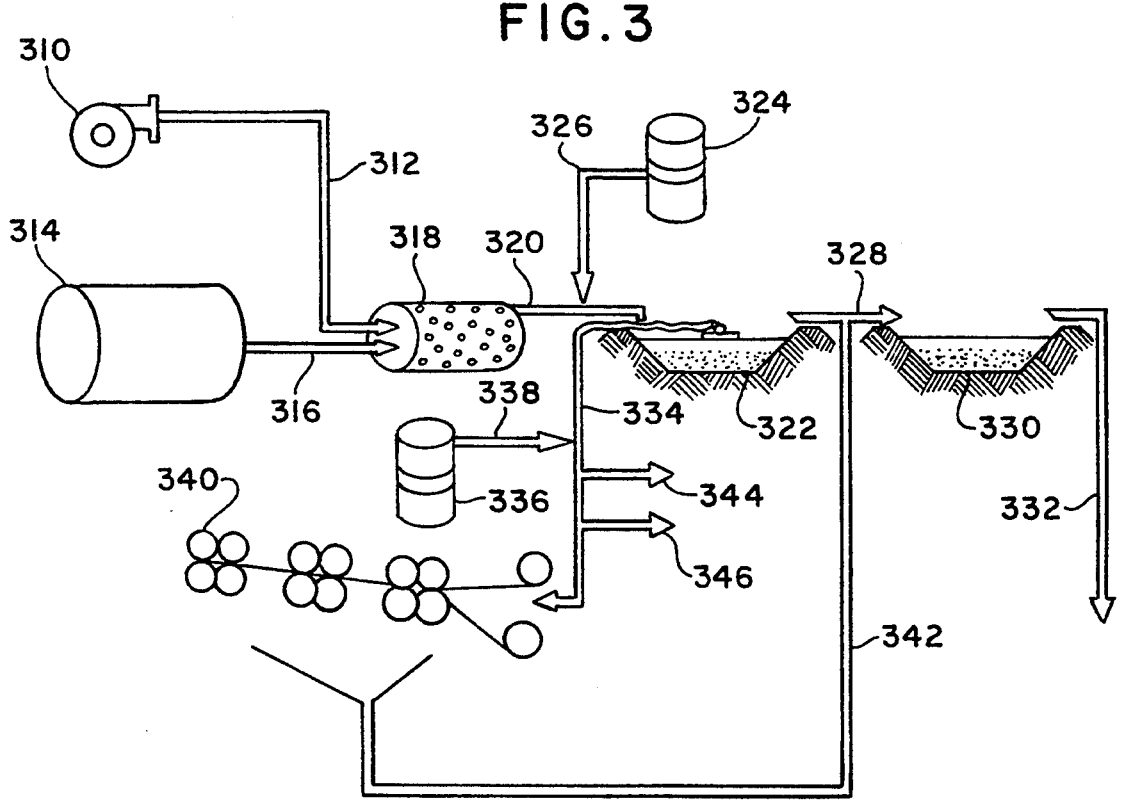
FIG. 4 is a schematic drawing of apparatus used to carry out a fourth preferred embodiment of the method of the present invention.

Referring to FIG. 4, waste water from raw water source 310 is removed in line 312 and mixed with neutralizing agent from tank 314 and line 316 in reaction tank 318 from where water is removed in line 320 to settling pond 322. Flocculating agent is introduced from polymer tank 324 through line 326. Water is removed from the settling pond in line 328 to polishing pond 330 from where outfall is removed in line 332. Floccules containing metal compound along with water are removed in line 334 and are mixed with additional polymer from tank 336 introduced through line 338 and then dewatered in belt filter press 340 from which water is removed to the polishing tank in line 342. Alternatively, portions of the floccules, water and polymer mixture in line 334 are also diverted to borehole 344 and drying bed 346.

The method and apparatus of the present invention is further described with reference to the following example.

EXAMPLE

350 GPM of waste water having a pH of 2, having dissolved metal concentrations of 10,000 ppm was first pumped from a collection area to a reaction vessel where it was aerated and agitated at a dissolved oxygen concentration of 3 lb./HP hour. Sodium hydroxide was added automatically as the neutralizing agent, at juxtaposition to the waste water, aeration and agitation point, to an adjusted pH of 8.5. The neutralized waste water is transferred to a flocculator reactor where a UNIFLOC 630 cationic polymer is added at a rate of 2 GPM. The instantaneous agglomeration of the neutralized waste water was transferred to a rotary drum thickener where water was filtered from the metal hydroxide sludge, where supernate water was removed to a polishing pond at a rate of approximately 300 GPM. Metal hydroxide sludge was removed from the rotary drum thickener at a rate of approximately 50 GPM to a belt filter press where a cationic polymer was added at a rate of 1 GPM. After processing through the belt filter press cake solids were recovered at a 15% to 40% dry solids. Water leaving the polishing pond consistently had a metal ion concentration below EPA permitted limits.

Although the invention has been described with a certain degree of particularity, it is to be understood that the present disclosure has been made only as an example and that the scope of the invention is defined by what is claimed hereafter.

What is claimed is:

1. A method for removing metal compounds selected from iron, manganese, aluminum, zinc, copper, lead, arsenic and chromium from waste water comprising the steps of:
   (a) adjusting the pH of the waste water to from about 5 to about 12;
   (b) aerating the waste water;
   (c) agitating the waste water, where steps (a), (b) and (c) are carried out simultaneously in a reaction tank and waste water is aerated in said reaction tank to provide a dissolved oxygen concentration at from about 0.01 lb./hr. to about 70 lbs./hr. at a waste water input flow rate of from about 50 gal./min. to about 500 gal./min. for a metals concentration of from about 50 mg./l. to about 1,000 mg./l.
   (d) then adding a flocculating agent polymer selected from a group consisting of cationic and anionic polymers to the water and allowing floccules including said metal compounds to form; and
   (e) then separating said floccules including said metal compounds from the water.

2. The method of claim 1 wherein there is added the further step (f) of further dewatering the floccules separated in step (e).

3. The method of claim 2 wherein additional flocculating agent polymer is added to at least a portion of the waste water containing the flocculated metal compound separated in step e.

4. The method of claim 3 wherein after the addition of the additional flocculating agent polymer, the flocculated metal compound is dewatered in step (f) in a belt filter press.

5. The method of claim 4 wherein there is water which is removed in step (f) and said water removed in step (f) is removed to a polishing pond.

6. The method of claim 2 wherein in step (e) separation is conducted by means of a clarifier.

7. The method of claim 6 wherein additional flocculating agent is added to at least a portion of the flocculated metal compound separated in step (e).

8. The method of claim 7 wherein after the addition of the additional flocculating agent polymer, the flocculated metal compound is dewatered in step (f) in a belt filter press.

9. The method of claim 8 wherein there is water removed in step (f) and said water removed in step (f) is removed to a polishing means.

10. The method of claim 2 wherein in step (e) separation is conducted by means of sequential treatment in a clarifier and a rotary drum thickener.

11. The method of claim 10 wherein additional flocculating agent polymer is added after the clarifier and then again after the rotary drum thickener.

12. The method of claim 11 wherein after the additional flocculating agent polymer, the flocculated metal compound is dewatered in step (f) in a belt filter press.

13. The method of claim 12 wherein there is water removed in step (f) and said water removed in step (f) is removed to a polishing pond.

14. The method of claim 11 wherein water removed in step (f) is removed to a settling pond.

15. The method of claim 2 wherein in step (e) separation is conducted by means of a settling pond.

16. The method of claim 15 wherein additional flocculating agent is added after the settling pond.

17. The method of claim 16 wherein after the additional polymer is added the flocculated metal compound is dewatered in step (f) in a belt filter press.

18. The method of claim 1 wherein in step (a) the pH is adjusted to from about 6 to about 9.

19. The method of claim 1 wherein in step (a) the pH is adjusted by adding a neutralizing agent selected from sodium hydroxide, anhydrous ammonia, sulfuric acid and hydrochloric acid.

20. The method of claim 1 wherein the polymer is a cationic polymer which is used for dewatering purposes.

21. The method of claim 1 wherein the polymer is an anionic polymer which is used for primary clarification purposes.

22. The method of claim 1 wherein the polymer is a anionic polymer which is used for settling purposes.

23. The method of claim 1 wherein the polymer is added in a dilute concentration of from about 0.5% to about 1.5% by weight.

24. The method of claim 1 wherein after step (e) a portion of the separated water is removed to a polishing pond.

25. The method of claim 1 wherein in step (e) separation is conducted by means of a rotary drum thickener.

* * * * *